May 1, 1956  C. B. KREKELER ET AL  2,743,917
SOCKET-MOUNTED CUTTER BIT AND SET SCREW ARRANGEMENT
Filed Nov. 4, 1952
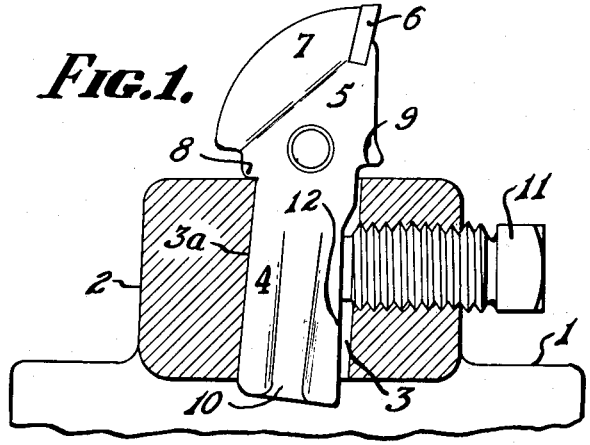
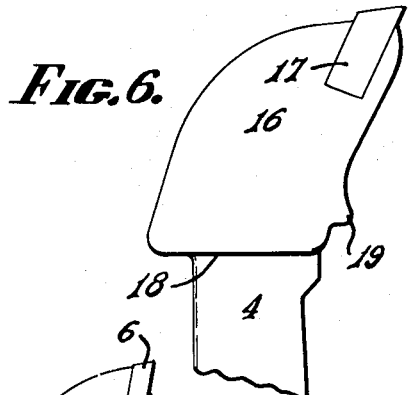
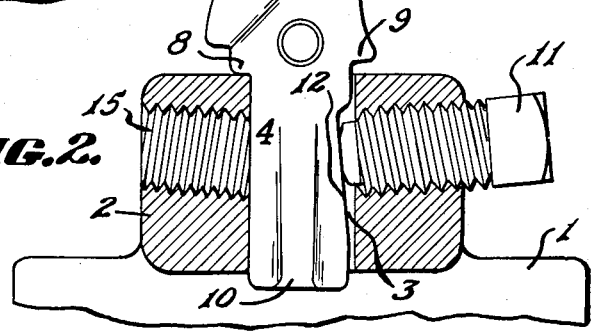
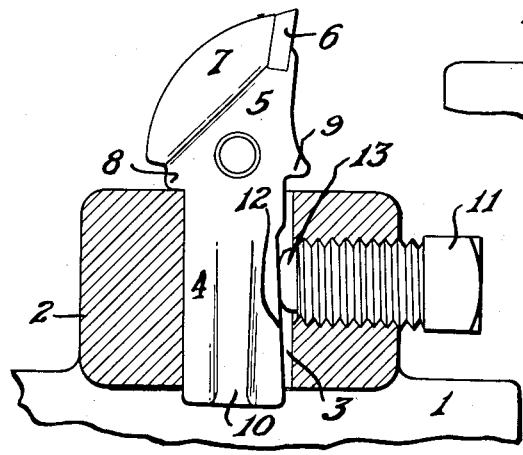
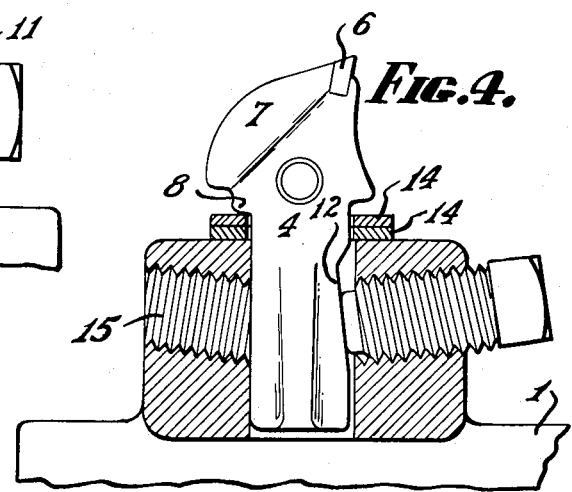
INVENTORS.
CLAUDE B. KREKELER
AND ARMIN O. BRUESTLE,
BY
ATTORNEYS.

United States Patent Office 2,743,917
Patented May 8, 1956

2,743,917

SOCKET-MOUNTED CUTTER BIT AND SET SCREW ARRANGEMENT

Claude B. Krekeler and Armin O. Bruestle, Cincinnati, Ohio, assignors to The Cincinnati Mine Machinery Company, Cincinnati, Ohio, a corporation of Ohio Application November 4, 1952, Serial No. 318,600

4 Claims. (Cl. 262—33)

Our invention relates to cutter bits and mountings therefor, and especially to types of mechanism in which cutters are moved by chains, as is usual in the undercutting of coal or other mineral deposits preparatory to blasting.

In well-known apparatus of this type, a chain is provided having sockets at suitable intervals. The development of satisfactory methods of joining relatively small pieces of exceedingly hard substances, such as tungsten carbide or other carbide materials, to preformed ferrous bodies, has made it possible to provide relatively low cost cutting tools having a head equipped with the hard cutting point, base, or edge, and a shank which can be engaged in the socket of a cutting chain.

The low cost of such structures makes it feasible to scrap the entire cutting tool when the hard cutting element has been worn away to the extent that it will no longer give service.

However, the provision of such structures has given rise to a serious problem of maintaining and adjusting them. It will be understood that the structures in question are subjected to severe stresses under heavy vibration; and attempts to maintain the shanks of the new cutters in the chain sockets merely by the clamping action of set screws have not been entirely satisfactory. Moreover, difficulties have been encountered in maintaining the gauge of the cutting tools or in adjusting the gauge if it has varied from that which is desired.

The principal objects of our invention lie in the provision of simple, sure and economical solutions to these problems. Other and ancillary objects of the invention will be set forth hereinafter or will be apparent to those skilled in the art upon reading these specifications. We accomplish the objects of our invention by that construction and arrangement of parts and mode of use of the structures of which we shall now describe certain exemplary embodiments. Reference is made to the accompanying drawings wherein:

Figure 1 is an elevational view with parts in section of an assembly including a chain socket, a cutting tool, and a set screw.

Figures 2, 3 and 4 are similar views of modified structures.

Figure 5 is a perspective view of a gauge adjusting element which we may use.

Figure 6 is a partial elevational view of a bit head of modified type.

In Figure 1, the numeral 1 represents a link of a cutting chain, not shown in full, since the nature of cutting chains is well known. The link is provided with a socket element 2, shown in section. The socket element is perforated as at 3 to provide a socket which will receive the shank 4 of a cutting tool. The cutting tool hereinafter referred to as a cutting "bit" has a body 5 to which the shank 4 is attached. At the outer end of the body there is a cutting element, such as a carbide insert 6. The specific material of this insert does not constitute a limitation on the invention. It may be any of those exceedingly hard alloy substances which are capable of being joined to ferrous bodies. Likewise, the specific material of the head and shank of the cutter bit is not a limitation on the invention. We ordinarily make our cutter bits from heat treated alloy steel. Behind the hard cutting insert 6, the side faces of the head may be beveled as at 7 to provide clearance. Our invention may also be practiced with bits which do not have a hard cutting insert, such, for example, as bits made from hard tool steel or high speed steel, the cutting part being preferably selectively hardened and the remainder of the head and shank being preferably drawn to retain ductility.

Where the shank 4 joins the body 5, there may be provided, if desired, a rear shoulder 8 and a forward shoulder 9, as shown. It is usual to chamfer the central side portions of the shank 4 to make them somewhat thinner, as shown at 10. The socket member 2 is perforated and threaded to accept a set screw indicated at 11.

It has been found in the use of structures such as we have just generally described that the strains and vibrations to which they are subjected in use are such as to loosen them after a relatively brief period of service if an attempt is made to hold the shank 4 in the socket 3 with one edge of the shank against an inner face of the socket, merely by a set screw engaging the opposite face of the shank. This is also true if the engaging end of the set screw is made hollow or otherwise provided with relatively sharp edges, the purpose of which is to cut into the edge of the shank 4. The extreme vibrations and stresses not only produce wear or slight permanent deformation of the parts, but also may produce a rapid loosening of the set screw once the initial tight engagement has become slightly relaxed.

Briefly, in the practice of our invention, we have found that tight engagement may be adequately maintained for very long periods of time providing (a) the parts are so configured, as hereinafter explained, that the clamping action of the set screw acts to exert a continuous force on the shank 4 tending to draw it further into the socket 3, providing (b) that a shoulder or abutment is used to resist this inward action, and providing (c) that the set screw properly engages the shank without cutting into it. The shoulder or abutment is preferably though not necessarily on the rear side of the bit.

The inward action on the cutter bit shank may be attained in various ways. One of these ways is illustrated in Figure 1 where the following factors will be observed. The major axis of the set screw 11 is parallel to the major axis of the socket member 2; but the axis of the socket 3 itself is tilted in the socket holder. This means that the major axis of the shank 4 is not perpendicular to the major axis of the set screw 11. The front edge of the shank 4 is beveled or slanted at an angle as indicated at 12 so that the slanted face of the edge lies substantially perpendicular to the major axis of the set screw 11. The arrangement is such, in Figure 1, that when the shank 4 is strongly pressed against the rear inside face 3a of the socket 3 by the action of the set screw, a wedging action occurs which would tend to make the rear edge of the shank 4 ride downwardly or inwardly along the rear face 3a of the socket were not such movement resisted by the shoulder 8. We have found that this action occurs most perfectly when the engaging end of the set screw 11 in the form shown is substantially flat and parallel with the beveled edge portion 12 of the cutter bit shank. Were the engaging end of the set screw 11 cup-shaped or otherwise provided with cutting edges which bite into the beveled face of the shank, an initially tight engagement would be secured; but this engagement would soon loosen, and the wedging action would be imperfect or non-existent.

The wedging action, as has been indicated, should be resisted by a suitable shoulder, and preferably by the rear shoulder 8. As a consequence, in the several figures, it will be noticed that the forward shoulder 9 is so placed that it does not contact the upper face of the socket member 2. The forward shoulder in these embodiments is useful for prying the bit out of the socket.

In Figures 2, 3 and 4, like index numerals have been used to indicate like parts. In the embodiment of Figure 2, the socket 3 has its axis parallel to the minor axis of the socket member 2; but in this instance the axis of the set screw 11 is tilted with respect to the major axis of the socket member, as shown. Again, the forward edge of the cutter bit shank 4 is beveled as at 12 and is engaged by the nose of the set screw. The beveled edge of the shank lies substantially perpendicular to the axis of the set screw 11. A similar wedging action occurs under these circumstances, and the tendency toward inward movement of the shank 4 is again resisted by the rear shoulder 8.

It is possible to secure the wedging action which we contemplate in a structure in which the major axis of the set screw is perpendicular to the axis of the cutter bit shank 4. Such a structure is illustrated in Figure 3. Here the socket 3 in the socket member 2 has its axis parallel to the minor axis of the socket member, while the axis of the set screw is parallel to the major axis of the socket member. The forward edge of the shank 4 is again slanted as at 12, but it will now be seen that the beveled face 12 is no longer perpendicular to the axis of the set screw. The flat nose of the set screw of Figure 1 would, in the construction of Figure 3, engage the beveled face 12 only at an edge. Such an engagement would greatly impair the wedging action which we seek. As a consequence, in the construction of Figure 3, we substitute for the flat nose a nose 13 which is somewhat convex and rounded, or even preferably flatly conical with the angularity of the conical surface such as to cause one side of it to conform to the angularity of the face 12. We have found that set screws having noses configured in either of these ways work excellently against the beveled face 12.

We have found that our construction solves the problems first set forth herein in a very excellent manner, maintaining a tight engagement of the cutter bit in the socket for very long periods of service. The deviation of the beveled face 12 of the cutter bit shank from true parallelism with the opposite or rear edge or face of the shank should lie approximately between 1° and 10°.

Those skilled in the art will understand that for various reasons a cutter chain assembly will be designed to make a certain overall width of cut to allow clearance for the mechanism itself. The desired width of cut may be different with different mechanisms. Any individual cutting bit will make only a relatively narrow cut; and the total width of cut is attained by tilting various bits at different angles to the general plane of the cutter assembly and transversely to that plane. In the construction which we have herein described, the tilting of the bits is accomplished by reason of the fact that the sockets 3 are formed in the socket elements 2 at different angularities transversely of the link members 1. While we have illustrated only an assembly of cutter chain links and cutting bit in which the bit appears to extend in the general plane of the link only, those skilled in the art will understand that the considerations set forth above will apply irrespective of the transverse angularity of the sockets 3.

The width of the cut of the cutter chain varies with the amount of extension of the outer edge of the bit to the upper or outer surface of the socket member 2, assuming all socket members to have similar dimensions. This extension is ordinarily called the gauge. In our construction the gauge of the cut with a new bit is determined by the position of a suitable shoulder which engages the upper surface of the socket member 2. It will be observed that our bits do not have any tilting motion with respect to the sockets. As a bit wears, however, its gauge will change, as will be evident. In the bits of our construction the cutting elements 6 can economically be made of sufficient size to sustain considerable wear, providing gauge can be maintained. Thus as the bits wear the shank 4 should be caused to move outwardly in the socket 3 to maintain the gauge; but the essential engagement of the shoulder 8 with the outer face of the socket member 2 should be maintained. This may be accomplished through the use of elements such as shown at 14 in Figures 4 and 5. These elements are washer-shaped members acting essentially as shims; but they surround the shank 4 so as to maintain their position, and at the rear of the cutter bit, they provide an abutment against which the shoulder 8 engages. The washer-shaped elements 14 may be made of any thickness desired, and may be used singly or in any desired multiples so as to maintain the gauge.

It will be noted in our construction, as illustrated in Figures 1 to 4, that the working edge of the cutting element 6 lies in substantial alignment with the front edge of the shank 4 (as distinguished from a prolongation of the beveled surface 12). The stresses on the cutting element 6 by reason of the cutting action are primarily rearward; and these are resisted at a relatively high angle by the shoulder 8. Secondarily, the stresses are inward, and these are also resisted by the shoulder 8. The net result of the structure and mode of engagement shown is a tight engagement of the bit in the socket element with the stresses and vibrations engendered by the cutting minimized as much as possible in their loosening action on the cutter bit.

The utility of our invention is not confined to such bits, however. In Figure 6 we have shown a bit having a shank 4, and a head 16 so shaped that a hard cutting insert 17 projects well forward of the shank. The entire lower edge of the head may be used as an abutment as at 18 to determine the gauge of the bit, and a pry-up protuberance may be provided as at 19.

In some constructions it may be desirable at times to reverse the links in the chain and concurrently to reverse the bits in the sockets. An oppositely directed threaded opening 15 for the acceptance of the set screw is shown in Figures 2 and 4; but this does not alter the force and effect of the construction and mode of engagement hereinabove described.

Modifications may be made in our invention without departing from the spirit of it. Having described our invention in certain exemplary embodiments, what we claim as new and desire to secure by Letters Patent is:

1. In combination, a cutter chain link including a socket forming member, said socket forming member having a socket forming perforation therein, said perforation having a front face and a rear face, and an integral cutter bit having a head and a solid shank demarked from said head by a rearwardly projecting shoulder, said shank extending into said perforation with the rearward edge of said shank contacting the rear face of said perforation throughout their common length, said shank having its forward edge spaced from the front face of said perforation and beveled at an angle of from 1 to 10 degrees with respect to the rearward edge thereof in a flat plane extending substantially from the free edge of said shank to a position adjacent said head so as to approach said rearward edge in the direction of said head, said socket forming member having a set screw therein opening through the front face of said perforation for contact with the beveled forward edge of said shank, the axis of said set screw being substantially perpendicular to the beveled edge of said shank, said set screw having a substantially flat nose the surface of which parallels the beveled edge of said shank, whereby to produce a wedging action tending to draw said shank further into said socket, said action being resisted by the engagement of said shoulder with the upper surface of said socket forming member.

2. The structure claimed in claim 1 wherein the front and rear faces of said perforation are parallel and wherein the longitudinal axis of said set screw is tilted downwardly and inwardly from a perpendicular with respect to the longitudinal axis of said perforation at an angle substantially equivalent to the angle defined by the beveled edge of said shank with respect to the rearward edge thereof.

3. The structure claimed in claim 1 wherein the longitudinal axis of said set screw extends parallel to the longitudinal axis of said socket forming member, and wherein the axis of said perforation is tilted away from a perpendicular with respect to the longitudinal axis of said socket forming member at an angle substantially equal to the angle defined by the beveled forward edge of said shank with respect to the rearward edge thereof.

4. The structure claimed in claim 1 including at least one shim element surrounding said shank and interposed between the said rearwardly projecting shoulder and the upper surface of said socket forming member, whereby the proper gage of said cutter bit may be maintained.

References Cited in the file of this patent

UNITED STATES PATENTS

| | | |
|---|---|---|
| Re. 22,451 | Fulke | Sept. 5, 1944 |
| 1,857,376 | Hoy | May 10, 1932 |
| 1,897,331 | Rassieur et al. | Feb. 14, 1933 |
| 2,297,570 | Long et al. | Sept. 29, 1942 |
| 2,305,040 | Stephens | Dec. 15, 1942 |
| 2,330,081 | Phipps | Sept. 21, 1943 |
| 2,644,679 | Simmons | July 7, 1953 |